US008458721B2

(12) United States Patent
Marathe et al.

(10) Patent No.: US 8,458,721 B2
(45) Date of Patent: Jun. 4, 2013

(54) SYSTEM AND METHOD FOR IMPLEMENTING HIERARCHICAL QUEUE-BASED LOCKS USING FLAT COMBINING

(75) Inventors: Virendra J. Marathe, Florence, MA (US); Nir N. Shavit, Cambridge, MA (US); David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 182 days.

(21) Appl. No.: 13/152,079

(22) Filed: Jun. 2, 2011

(65) Prior Publication Data

US 2012/0311606 A1 Dec. 6, 2012

(51) Int. Cl.
*G06F 9/46* (2006.01)

(52) U.S. Cl.
USPC .......................................... 718/107; 719/314

(58) Field of Classification Search
USPC .................. 718/100, 107; 719/310, 312, 313, 719/314
See application file for complete search history.

(56) References Cited

U.S. PATENT DOCUMENTS

| | | | | |
|---|---|---|---|---|
| 5,991,845 | A * | 11/1999 | Bohannon et al. ............ | 710/200 |
| 6,289,369 | B1 * | 9/2001 | Sundaresan .................... | 718/103 |
| 6,772,255 | B2 * | 8/2004 | Daynes ........................... | 710/200 |
| 6,965,961 | B1 * | 11/2005 | Scott .............................. | 710/310 |
| 6,981,260 | B2 * | 12/2005 | Brenner et al. ............... | 718/103 |
| 7,406,698 | B2 * | 7/2008 | Richardson .................... | 719/321 |
| 7,496,726 | B1 * | 2/2009 | Nussbaum et al. ............ | 711/163 |
| 7,509,448 | B2 * | 3/2009 | Fachan et al. ................. | 710/200 |
| 7,594,234 | B1 * | 9/2009 | Dice .............................. | 718/108 |
| 7,945,912 | B1 * | 5/2011 | Nussbaum et al. ............ | 718/104 |
| 8,037,476 | B1 * | 10/2011 | Shavit et al. .................. | 718/104 |
| 8,046,758 | B2 * | 10/2011 | Dice .............................. | 718/100 |
| 8,051,418 | B1 * | 11/2011 | Dice .............................. | 718/102 |
| 8,082,379 | B2 * | 12/2011 | Fachan et al. ................. | 710/200 |
| 2003/0200457 | A1 * | 10/2003 | Auslander et al. ............ | 713/200 |

OTHER PUBLICATIONS

Anderson, T.: The performance implications of spin lock alternatives for shared-memory multiprocessors. IEEE Trans. Parallel and Distributed Systems. vol. 1, issue 1. (1990) pp. 6-16.
Craig, T.: Building FIFO and priority-queueing spin locks from atomic swap. Technical Report TR 93-02-02, University of Washington, Dept of Computer Science (1993).

(Continued)

*Primary Examiner* — Van Nguyen
(74) *Attorney, Agent, or Firm* — Robert C. Kowert; Meyertons, Hood, Kivlin, Kowert & Goetzel, P.C.

(57) ABSTRACT

The system and methods described herein may be used to implement a scalable, hierarchal, queue-based lock using flat combining. A thread executing on a processor core in a cluster of cores that share a memory may post a request to acquire a shared lock in a node of a publication list for the cluster using a non-atomic operation. A combiner thread may build an ordered (logical) local request queue that includes its own node and nodes of other threads (in the cluster) that include lock requests. The combiner thread may splice the local request queue into a (logical) global request queue for the shared lock as a sub-queue. A thread whose request has been posted in a node that has been combined into a local sub-queue and spliced into the global request queue may spin on a lock ownership indicator in its node until it is granted the shared lock.

20 Claims, 10 Drawing Sheets

OTHER PUBLICATIONS

Mellor-Crummey, J., Scott, M.: Algorithms for scalable synchronization on shared-memory multiprocessors. ACM Trans. Computer Systems vol. 9, issue 1. (1991). pp 21-65.

Magnussen, P., Landin, A., Hagersten, E.: Queue locks on cache coherent multiprocessors. In: Proc. 8th International Symposium on Parallel Processing (IPPS). (1994). pp. 165-171.

Radović, Z., Hagersten, E.: Hierarchical Backoff Locks for Nonuniform Communication Architectures. In: HPCA-9, Anaheim, California, USA (2003). pp. 241-252.

Victor Luchangco and Dan Nussbaum and Nir Shavit: A Hierarchical CLH Queue Lock. In: Proceedings of the 12th International Euro-Par Conference. (2006). pp. 801-810.

Hendler, D., Incze, I., Shavit, N., Tzafrir, M.: Flat Combining and the Synchronization-Parallelism Tradeoff. In: Proceedings of the 22nd ACM Symposium on Parallelism in Algorithms and Architectures. (2010) pp. 355-364.

\* cited by examiner

SYSTEM AND METHOD FOR IMPLEMENTING HIERARCHICAL QUEUE-BASED LOCKS USING FLAT COMBINING

BACKGROUND

1. Field of the Disclosure

This disclosure relates generally to hierarchical locks, and more particularly to systems and methods for using flat combining to build hierarchical queue-based locks.

2. Description of the Related Art

Queue locks, such as CLH and MCS style locks, have historically been the algorithms of choice for locking in many high performance systems. These locks are known to reduce overall invalidation traffic in high performance systems by forming queues of threads, each spinning on a separate memory location as they await their turn to access a critical section or shared resource protected by a shared lock. Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (as found on a single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Access by a core to its local memory, and in particular to a shared local cache, can be several times faster than access to a remote memory (e.g., one located on another chip).

Recent papers show that performance gains can be obtained on NUMA architectures by developing hierarchical locks, i.e., general-purpose mutual-exclusion locks that encourage threads with high mutual memory locality to acquire the lock consecutively, thus reducing the overall level of cache misses when executing instructions in a critical section protected by the lock. For example, one paper describes a hierarchical back-off lock (referred to herein as an HBO lock). The HBO lock is a test-and-test-and-set lock augmented with a back-off scheme to reduce contention on the lock variable. The hierarchical back-off mechanism of the HBO lock allows the back-off delay to be tuned dynamically, so that when a thread notices that another thread from its own local cluster owns the lock, it can reduce its delay and increase its chances of acquiring the lock consecutively. However, because the locks are test-and-test-and-set locks, they incur invalidation traffic on every modification of the shared global lock variable, which is especially costly on NUMA machines. Moreover, the dynamic adjustment of back-off delay time in the lock introduces significant fairness issues. For example, it becomes likely that two or more threads from the same cluster will repeatedly acquire a lock while threads from other clusters starve.

Another paper describes a hierarchical version of the CLH queue-locking algorithm (referred to herein as an HCLH lock). The HCLH algorithm collects requests on each chip into a local CLH style queue, and then allows the thread at the head of the queue to integrate each chip's queue into a single global queue. This avoids the overhead of spinning on a shared location and prevents starvation issues. However, the algorithm forms the local queues of waiting threads formed by having each thread perform a register-to-memory-swap (SWAP) operation on the shared head of the local queue. These SWAPs to a shared location cause a bottleneck and introduce significant overhead. For example, the thread merging the local queue into the global queue must either wait for a long period of time or merge an unacceptably short local queue into the global queue. Furthermore, the HCLH mechanism includes complex condition checks along its critical execution path in order to determine if a thread must perform the operations of merging local CLH queues with the global queue.

SUMMARY

As noted above, the ongoing growth of multicore machines is likely to shift the multiprocessor design space in the NUMA and CC-NUMA direction. As a result, there is a growing need to develop concurrent algorithms and synchronization mechanisms that will adapt well to these emerging machines. The system and methods described herein may in some embodiments implement a scalable, hierarchical, queue-based lock algorithm that employs a flat combining synchronization paradigm. This algorithm may include mechanisms for building long sub-queues of adjacent local nodes, delivering good locality of reference for threads accessing a critical section or shared resource that is protected by the hierarchical lock, and merging them into a global request queue (e.g., an MCS style global request queue or another type of global request queue). In some embodiments, the algorithm may build the local and global request queues in a highly efficient way by parallelizing the process of creating local sub-queues for each cluster of processor cores using flat combining. The flat combining may be performed with little interconnection traffic and very few costly synchronization operations, in the common case. This algorithm has been demonstrated to adapt and scale significantly better than existing locks, including well-known hierarchical locks.

In some embodiments, a thread of a multithreaded application executing on a given processor core in a cluster of processor cores that share a memory may post a request to acquire a shared lock in a publication list for the cluster. The publication list may include a plurality of nodes, each of which is associated with a respective thread that accesses the shared lock. The thread may post its lock acquisition request using a non-atomic operation to write a particular value to an indicator of a pending request in the node associated with the thread. The thread, acting as a combiner thread, may build a local lock acquisition request queue that includes the node associated with the thread and one or more other nodes of the publication list for the cluster, each of which is associated with a respective thread that has posted a request to acquire the shared lock. In building the local lock acquisition request queue, the combiner thread may traverse the publication list one or more times to identify other nodes that are associated with threads that have posted requests to acquire the shared lock. In some embodiments, the number of times that the combiner thread traverses the publication list may be dependent on a heuristic that considers the effectiveness of one or more previous local lock acquisition request queue building operations performed by the combiner thread and/or by other threads acting as the combiner thread. The local lock acquisition request queue may be an ordered queue in which each node of the queue includes a pointer to its successor node in the queue. In some embodiments, the local lock acquisition request queue may be a logical queue in which the nodes of the queue are shared with the nodes of the publication list for the cluster (i.e. the local lock acquisition request queue may be thought of as being superimposed on the nodes of the publication list).

In some embodiments, the combiner thread may splice the local lock acquisition request queue that it has built into a global lock acquisition request queue for the shared lock as a sub-queue of the global lock acquisition request queue. The global lock acquisition request queue may include one or more other sub-queues, each of which includes one or more nodes associated with threads executing on a processor core in a different cluster of processor cores. In various embodiments, the splicing operation may include atomically replacing the value of a pointer that identifies the tail node of the global lock acquisition request queue with the value of a pointer that identifies the tail node of the local lock acquisition request queue (i.e. the sub-queue being spliced into the global lock acquisition request queue), and/or replacing the value of a pointer in the tail node of the global lock acquisition request queue that identifies the next node in the global lock acquisition request queue with the value of a pointer that identifies the head node of the local lock acquisition request queue (i.e. the sub-queue being spliced into the global lock acquisition request queue). In some embodiments, the global lock acquisition request queue may be a logical queue in which the nodes of the queue are shared with the nodes of one or more publication lists for one or more clusters of processor cores.

Once the thread has combined its publication list node into the local lock acquisition request queue and spliced the local lock acquisition request queue into the global lock acquisition request queue, it may wait for an indication that it has been granted the shared lock. In some embodiments, waiting for such an indication may include the thread repeatedly reading the value of an indicator of lock ownership in the node associated with the thread (i.e. spinning on the lock ownership indicator) until the value of the indicator indicates that the thread has been granted ownership of the shared lock. In other embodiments, the thread may spin on an indicator in another node, such as its predecessor's node. In response to the thread receiving an indication that it has been granted the shared lock, the thread may access a critical section or shared resource that is protected by the shared lock.

In some embodiments, a given thread of the application may determine that one or more local lock acquisition request queues previously built by the given thread were of a length shorter than a pre-determined minimum target length, and may post a request to acquire the shared lock directly to the global lock acquisition request queue, rather than to the publication list for the cluster in which it is executing. In such embodiments, posting the request directly to the global lock acquisition request queue may include the given thread using an atomic operation to insert a node associated with the given thread as a new tail node of the global lock acquisition request queue. After posting its request to the global lock acquisition request queue, the given thread may spin on the lock ownership indicator in its publication list node until it is granted the shared lock In some embodiments, a given thread may post a request to acquire a shared lock in a publication list for the cluster, but may not act as a combiner thread. In this case, the given thread may wait for an indication that its request has been combined into the local lock acquisition request queue (i.e. for splicing into the global lock acquisition request queue), after which it may spin on the lock ownership indicator in its publication list node until it is granted the shared lock.

Note that although many of the embodiments described herein include MCS style locks (e.g., an MCS style global request queue), it should be noted that the techniques and mechanisms disclosed herein for implementing hierarchical queue-based locks using flat combining may be applicable in other contexts in which critical sections and/or shared resources may be protected by other types of locks (e.g., CLH style locks). For example, these techniques may be used to build a hierarchical queue-based lock structure in which local sub-queues are created using flat combining, and these sub-queues are then spliced (by the combiner) into a CLH style global request queue.

Figure 1:
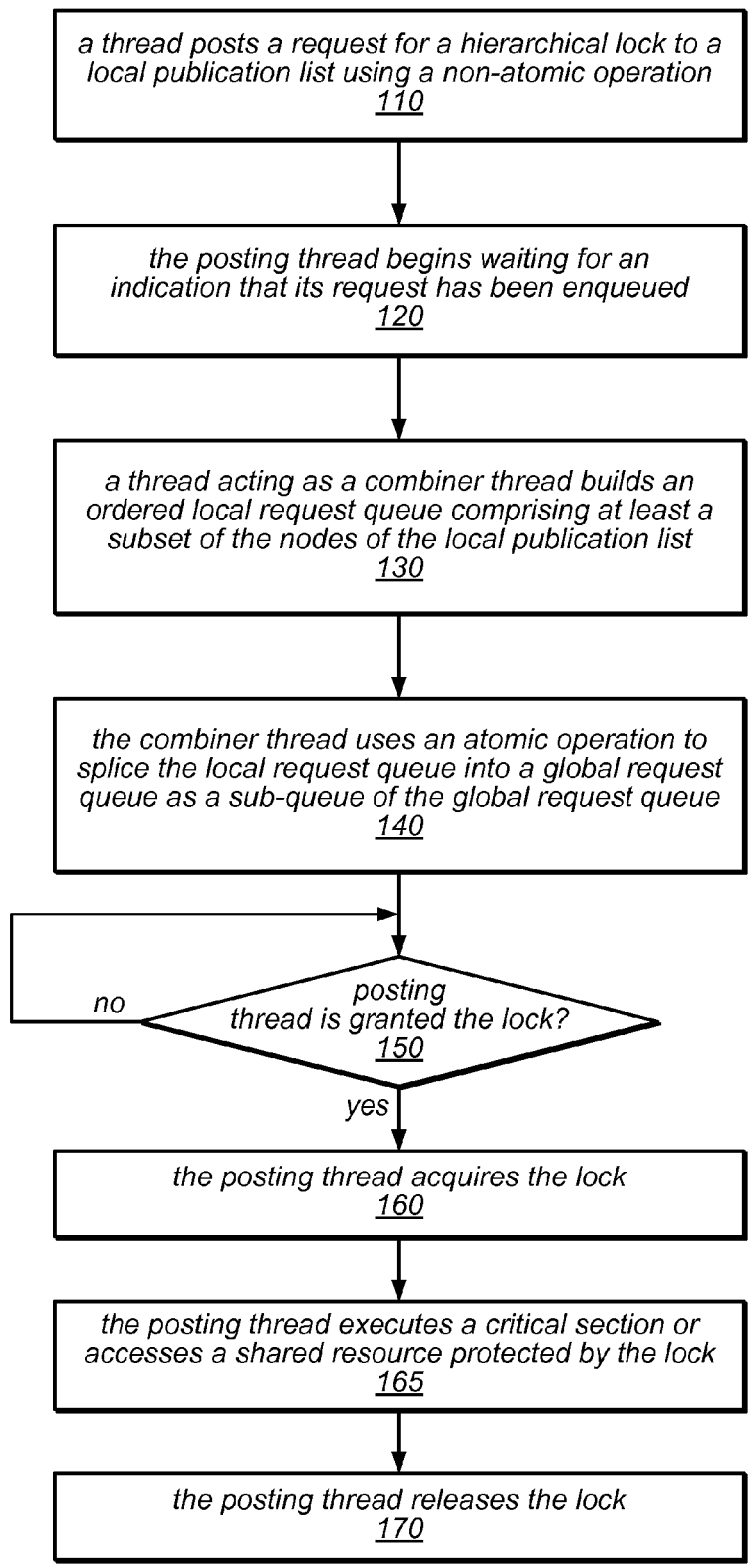
FIG. 1 is a flow diagram illustrating one embodiment of a method for implementing a flat-combining hierarchical lock, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Multicore machines are growing in size, and accordingly shifting from simple bus-based designs to NUMA and CC-NUMA architectures. With this shift, the need for scalable hierarchical locking algorithms is becoming crucial to performance. The system and methods described herein may in some embodiments be used to implement scalable hierarchical queue-based locks based on the flat combining synchronization paradigm. The algorithm for these locks includes a mechanism for building local queues of waiting threads in a highly efficient manner, and then merging them globally, all with little interconnection traffic and virtually no costly synchronization operations in the common case. In empirical testing on a state-of-the-art 256-way CC-NUMA machine, the flat-combining hierarchical lock described herein significantly outperformed all classic locking algorithms, and at high concurrency levels provided a factor of two improvement over HCLH, the most efficient known hierarchical locking algorithm to date.

The flat-combining MCS lock (FC-MCS) described herein is a hierarchical queue-lock design based that builds on a combination of a flat-combining coordination paradigm and the MCS locking algorithm. Flat combining (FC) is a mutual-exclusion-based client-server style synchronization paradigm introduced to speed up operations on shared data structures. It has been discovered that the use of flat combining may in some embodiments add scalability to hierarchical locks. The original flat combining implementation uses mutual exclusion to repeatedly pick a unique "combiner" thread that will apply all other thread's operations to the structure. For example, a given sequential data structure D that is protected by a lock has an associated dynamic publication list whose size is proportional to the number of threads that are concurrently accessing it. Each thread accessing D for the first time adds a thread-local node to the publication list, and publishes all its successive access and/or modification requests using a simple write to a request field of its node in the publication list. In each access, after writing its request, a thread determines whether the shared lock is free, and if so attempts to acquire it using a compare-and-swap (CAS) type operation. A thread that successfully acquires the lock becomes a combiner thread. The combiner thread scans the publication list, collects pending requests, applies the combined requests to D, writes the results back to the threads' request fields in the associated nodes in the publication list, and releases the lock. A thread that detects that some other thread already owns the lock spins on its record, waiting for the owner to return a response in its request field, at which point it knows the published request has been applied to D.

In some embodiments, the FC-MCS algorithm described herein may employ a simplified and streamlined variant of the FC algorithm to more efficiently construct an MCS style local request queue from among threads in a given cluster than would be possible using the original FC algorithm. In such embodiments, waiting threads may spin on their own local nodes while attempting to select one thread as a designated combiner thread for each cluster. The combiner thread may construct a local request queue by collecting the requests of all spinning threads in its cluster, and then may splice these local request queues seamlessly into a global MCS style queue (e.g., a global request queue that has a handover structure similar to that of an MCS queue lock). In some embodiments, combiner threads from various clusters may repeatedly merge their local request queues into a single global request queue (e.g., as sub-queues of the global request queue). As described in detail herein, the use of flat combining may reduce overhead and introduce parallelism into the sub-queue creation process, and this parallelism, in turn, may allow the system to deliver improved performance.

In some embodiments, employing the flat combiner approach described herein to implement hierarchical queue-based locks may allow these locks to overcome a significant drawback of HCLH locks, especially at high concurrency levels. Specifically, unlike with HCLH locks, the methods described herein allow threads to be collected into the local request queue quickly, by allowing threads to post requests in parallel using only a simple write to an unshared location. By contrast, sequences of SWAP operations are performed on a shared location to create local queues in the HCLH algorithm. This more efficient queue creation approach may allow the combiner thread to form relatively long local queues, and to do so with little delay. For example, in some experiments, combiner threads were able to quickly and efficiently collect something on the order of 90% of locally waiting threads. Moreover, the common case critical path in the FC-MCS algorithm described herein is significantly shallower than that of the HCLH algorithm, which may contribute to its improved performance over the HCLH algorithm.

One embodiment of a method for implementing a flat-combining queue-based hierarchical lock is illustrated by the flow diagram in FIG. 1. As illustrated at 110, in this example, the method may include a thread posting a request for the hierarchical lock (e.g., a lock that controls access to a critical section or a shared resource) to a local publication list. In some embodiments, the publication list may be implemented as a linked list of thread-local nodes of a size proportional to the number of threads that are executing in the local cluster and that are concurrently accessing the hierarchical lock. In some embodiments, the thread may post the request by writing a particular value to a node of the publication list using a non-atomic write operation. The posting thread may then wait for an indication that its request has been enqueued (e.g. an indication that it has been added to the local and/or global request queues), as in 120.

As illustrated at 130, a thread acting as a combiner thread may (at some point) build an ordered local request queue comprising at least a subset of the nodes of the publication list. In some embodiments, the local request queue may be an MCS-style queue. The local request queue may in some embodiments be built as a logical queue superimposed on the nodes of the publication list, rather than as a queue of nodes distinct from the nodes of the publication list (e.g., nodes copied from the publication list nodes). As described in more detail herein, in some cases, the combiner thread may be the same thread as the posting thread, while in other cases the combiner thread may be a different thread than the posting thread. The actions taken by the combiner thread are further illustrated in FIGS. 3 and 4, and described in more detail below, according to one embodiment.

Figure 5:
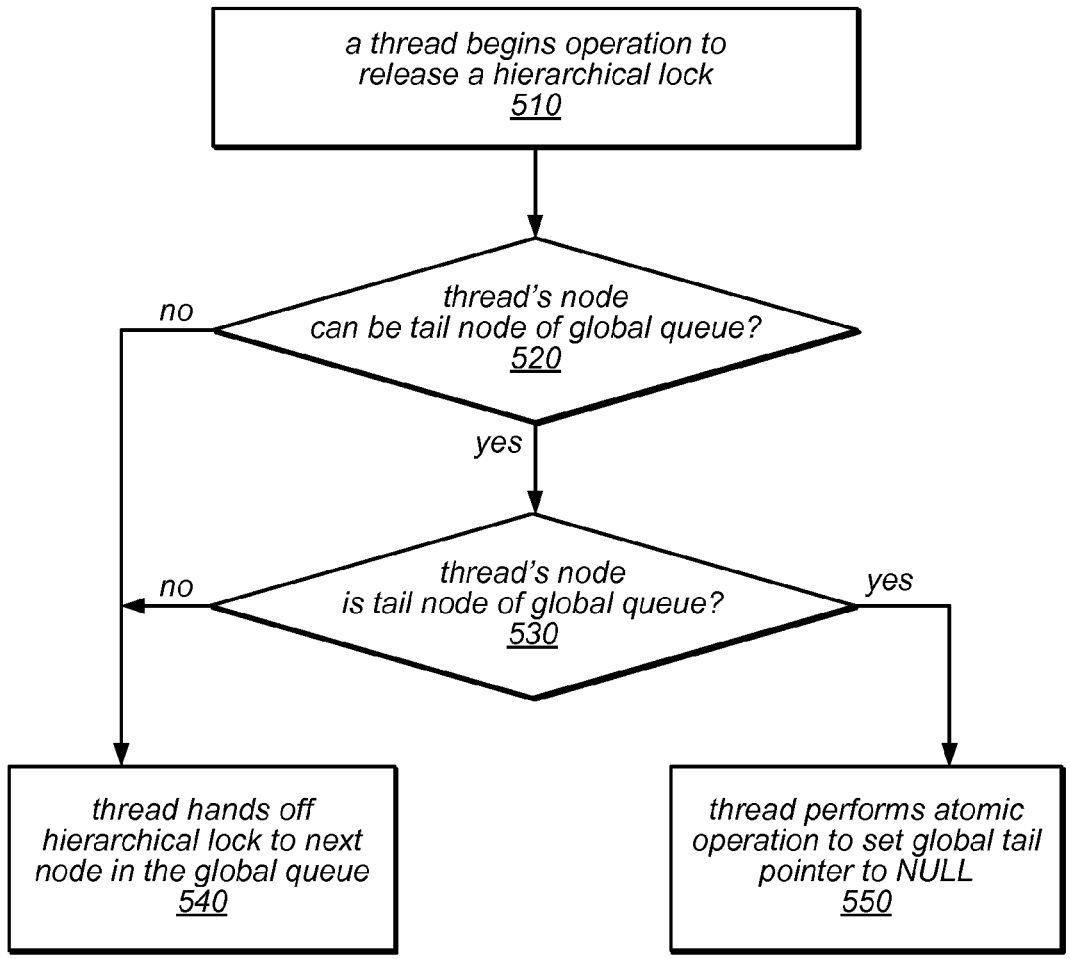
FIG. 5 is a flow diagram illustrating a method for releasing a flat-combining hierarchical lock, according to one embodiment.

After building the local request queue, the combiner thread may use an atomic operation to splice the local request queue into a global request queue, as in 140. In other words, the local request queue may become a sub-queue of the global request queue, again superimposed on the nodes of one or more underlying publication lists. As illustrated at 150 in FIG. 1, the posting thread may wait for an indication that it has been granted the hierarchical lock. For example, the posting thread may spin on a field in its own publication list node (which is also included in the local and/or global queues), waiting for an indication that it has been granted the lock. The posting thread may then acquire the hierarchical lock, as in 160, and may execute the critical section or access the shared resource protected by that lock, as in 165. At some point (e.g., when the posting thread has completed execution of the critical section or no longer needs to access the shared resource), the method may include the posting thread releasing the hierarchical lock, as in 170. A method for releasing a hierarchical lock is illustrated in FIG. 5 and described below, according to one embodiment.

In many of the examples described herein, it may be assumed that the computer system is organized into clusters of computing cores, each of which has a large cache that is shared among the cores local to that cluster. In such embodiments, inter-cluster communication may be significantly more expensive than intra-cluster communication. As used herein, the term "cluster" may be used to refer to a collection of processor cores, and to make clear that this collection of cores could include cores on a single multicore chip, or cores on a collection of multicore chips that have proximity to the same memory or caching structure, depending on the size of the NUMA machine implemented in the system. In these examples, it may also be assumed that each cluster has a unique cluster id known to all threads on the cluster.

Figure 2:
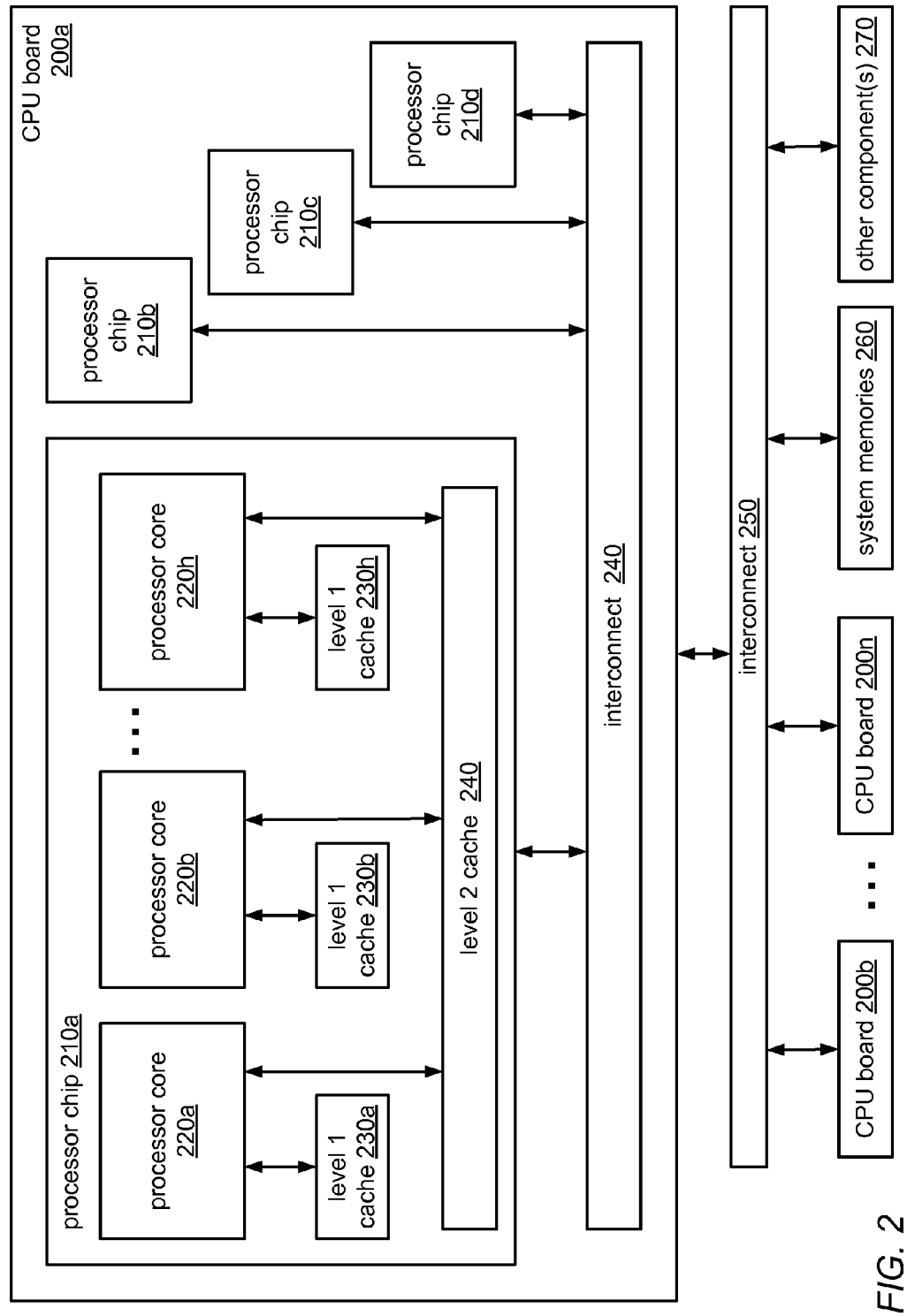
FIG. 2 is a block diagram illustrating a portion of a computer system that implements a NUMA style memory architecture.

FIG. 2 illustrates a portion of a computer system that implements a NUMA style memory architecture. In this example, the computer system includes multiple CPU boards 200 (shown as 200a-200n) that communicate with each other over interconnect 250. One of these CPU boards (200a) is illustrated in more detail than the others. In some embodiments, each of the CPU boards 200 may include the same or a similar architecture as that illustrated for CPU board 200a. In other embodiments, each of the CPU boards may include a different number and/or arrangement of processor cores, caches, etc. As illustrated in FIG. 2, the computer system may also include one or more system memories 260 and/or other components 270. In this example, CPU board 200a includes four processor chips (shown as processor chips 210a-210d) that communicate with each other over interconnect 240, one of which is illustrated in more detail. In this example, it is assumed that the processor chips 210b-210d include an architecture similar to that of processor chip 210a.

In the example illustrated in FIG. 2, processor chip 210a includes eight processor cores (shown as 220a-220h), and each processor core has a respective (dedicated) level 1 (L1) cache (shown as 230a-230h). Each processor core may be a multi-threaded core, in some embodiments. For example, in one embodiment each processor core may be capable of concurrently executing eight hardware threads. The threads executing on a given processor core 220 may share the level 1 cache 230 for that processor core 220, and accesses to this level 1 cache, which may be considered local to the processor core 220 and its hardware threads, may be extremely fast. In addition, the eight processor cores 220 may share the level 2 (L2) cache 240 for processor chip 210a, and accesses to this level 2 cache may also be fast, although not as fast as those to each processor core's own level 1 cache. In this example, accesses to caches of a different processor chip 210 on the same CPU board 200, to caches of a processor chip 210 on a different CPU board 200, and to various system memories 260 (all of which may be considered remote accesses with respect to a hardware thread executing a particular processor core 220 of processor chip 210a) may exhibit increasingly higher latency, when compared to accesses to the level 1 and level 2 caches that are local to that hardware thread.

As previously noted, performance gains may be obtained on NUMA architectures by employing hierarchical locks that encourage threads with high mutual memory locality to acquire the lock consecutively, thus reducing the overall level of cache misses when executing instructions in a critical section protected by the lock. The systems and methods described herein for implementing hierarchical queue-based locks using flat combining may result in such high memory locality, since this algorithm encourages batches of lock acquisition requests from threads in a single cluster (e.g., threads that share a level 1 or level 2 cache) to be executed sequentially.

In some embodiments, a hierarchical FC-MCS lock may include a collection of local request queues, e.g., one per cluster, and a single global request queue. The local request queues may be implemented as flat-combining queues, and each instance of a flat-combining queue may include a local flat-combining lock, a counter whose value reflects the number of combining passes that has been performed for a given combining operation, a pointer to the head of a publication list, and pointers to the head and tail of the local request queue (and, after a splicing operation, of the corresponding sub-queue of the global request queue). As previously noted, the publication list may in some embodiments include a collection of thread-local nodes in a dynamic-sized linked list, and its size (i.e. length) may be proportional to the number of threads that are concurrently accessing the lock. In other embodiments, the publication list may be implemented as an array. However, a dynamic publication list using thread local pointers may provide a more practical solution, especially in embodiments in which the number of potential threads may be unknown. In addition, implementing the publication list as an array may lead to a renaming problem among the threads accessing it that must be resolved. This may in some embodiments require a compare-and-swap (CAS) type operation per location, which could result in the system providing relatively little advantage over existing techniques. In addition, implementing the publication list as a dynamic-sized linked list may allow the same nodes used in the flat-combining publication list to be used in the local request queues and global request sub-queues of the MCS-style queue-based locking algorithm described herein. Therefore, threads may spin on the same nodes in both the combining and lock-awaiting phases.

Figure 3:
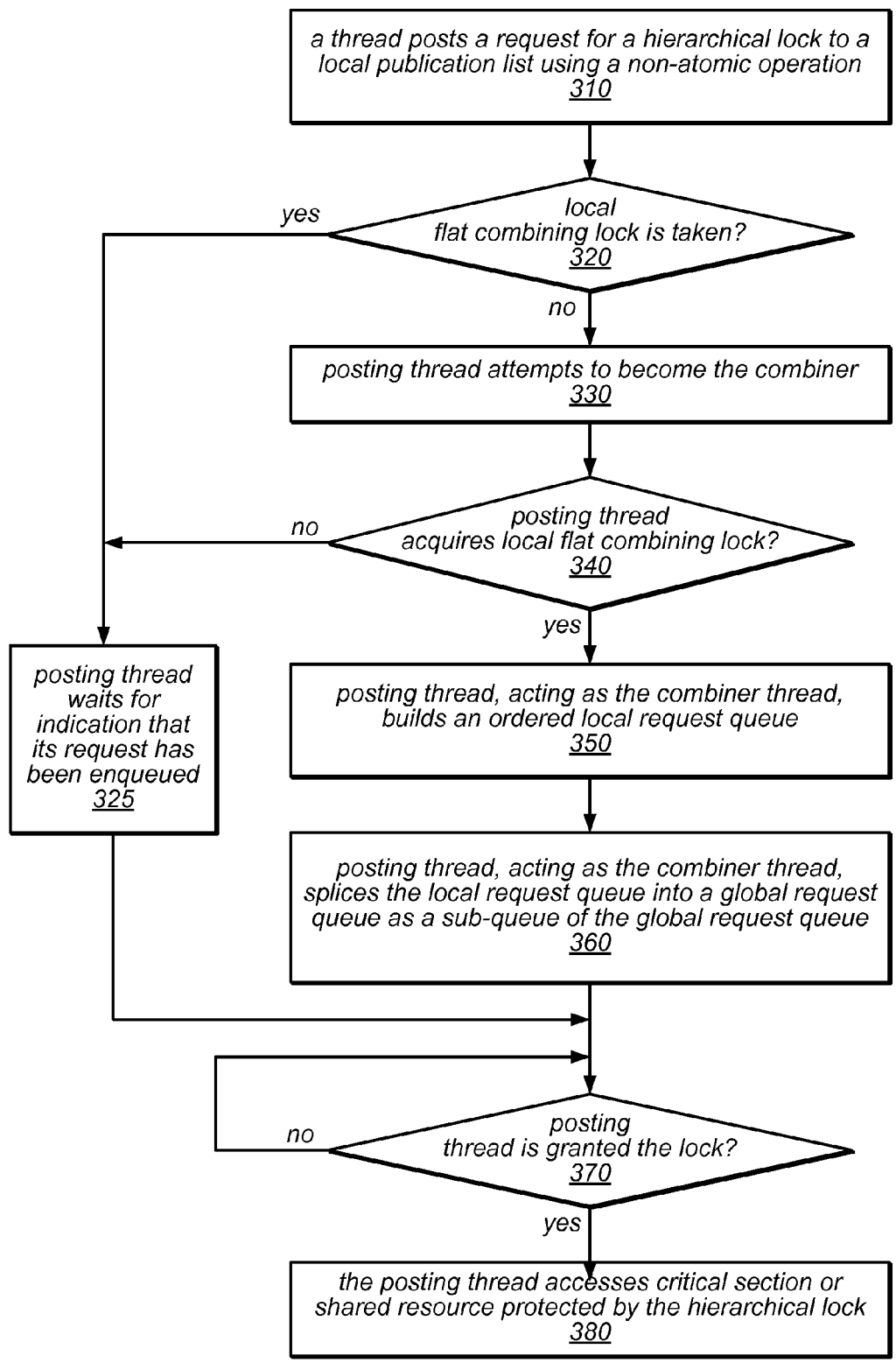
FIG. 3 is a flow diagram illustrating a method for acquiring a flat-combining hierarchical lock, according to one embodiment.

A method for acquiring a queue-based hierarchical lock (e.g., a hierarchical lock that controls access to a critical section or a shared resource) is illustrated by the flow diagram in FIG. 3, according to one embodiment. As illustrated at 310, in this example, a thread may post a request for the hierarchical lock to a local publication list (i.e. a publication list for the local cluster in which the thread is executing). For example, the thread may indicate its lock acquisition request by setting a "request ready" field of its thread local publication node to "true". In some embodiments, this operation may be performed using a standard, non-atomic write operation (i.e. there may be no need to use a load-store memory barrier or any other memory barrier when posting the request). Note that in some embodiments if there is no thread local publication node for this thread, the method may include allocating a thread local publication node for the thread, and marking it as active. Similarly, if there is a thread local publication node for this thread, but it is marked as inactive, the method may include marking it as active. In either of these cases, the thread may then execute a store-load memory barrier, and proceed to insert its node into the head of the publication list (e.g., by repeatedly attempting to perform a successful CAS type operation to insert the node at the head of the list). Once a new node has been inserted (or an inactive node has been marked as active), the thread may set the "request ready" field of the node to "true".

Figure 4:
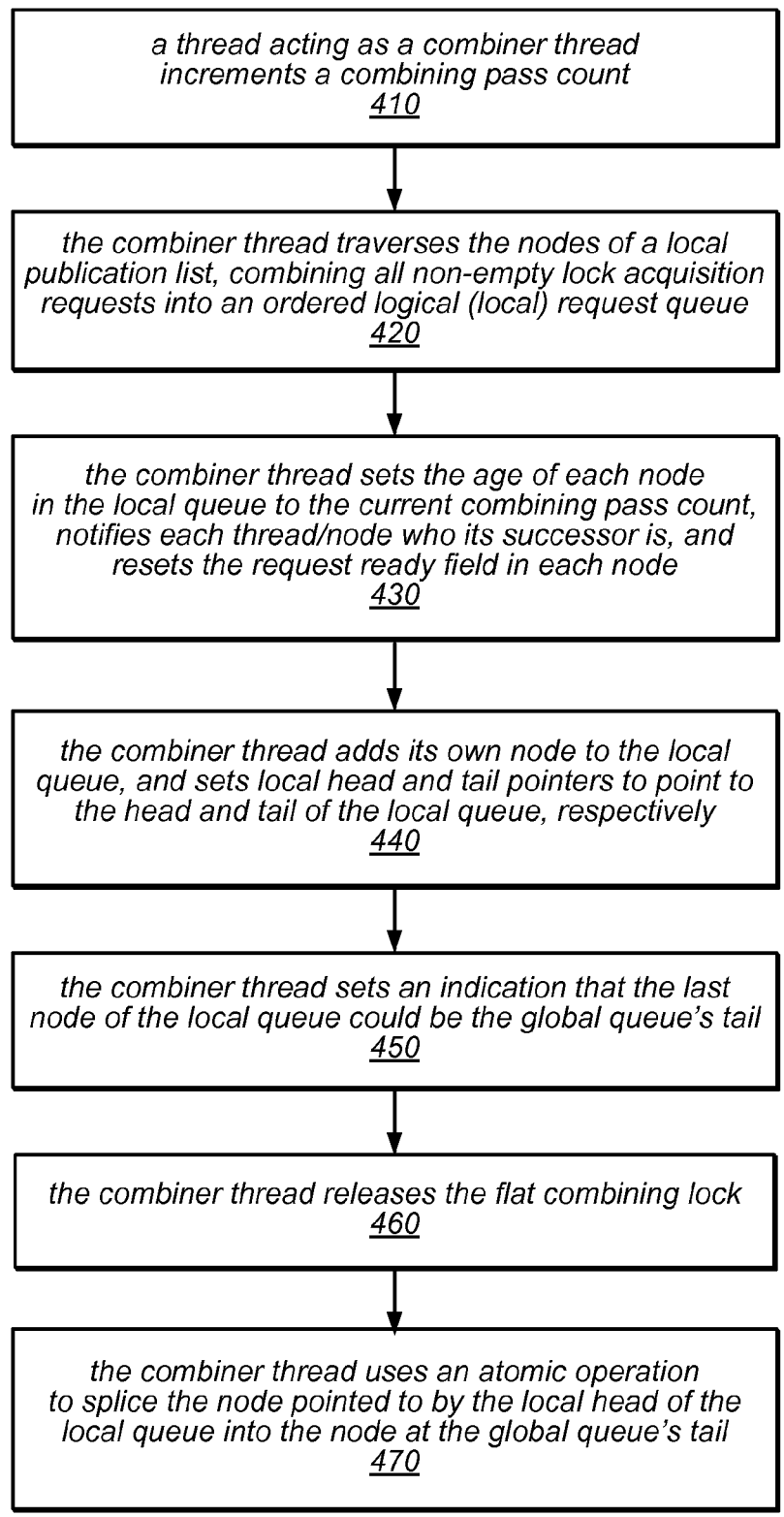
FIG. 4 is a flow diagram illustrating a method for building an ordered local request queue and splicing it into a global queue, according to one embodiment.

As illustrated at 320 in FIG. 3, the method may include the thread determining whether the local flat-combining lock is already taken. If the flat-combining lock for the local cluster is not currently taken (i.e. held), no other thread is currently acting as a combiner thread for the local cluster. In this case, shown as the negative exit from 320, the posting thread may attempt to become the combiner thread for the local cluster, as in 330. For example, the posting thread may attempt to acquire the local flat-combining lock using a CAS type operation. If the posting thread is successful in its attempt to acquire the local flat-combining lock, shown as the positive exit from 340, the method may include the posting thread becoming the combiner thread. In this case, the posting thread, acting as the combiner thread, may build an ordered local request queue (as in 350), and may splice the local request queue into a global request queue as a sub-queue of the global request queue (as in 360). One method for building an ordered local request queue and splicing it into a global queue is illustrated in FIG. 4 and described in detail below, according to one embodiment. Note that in some cases, after acquiring the flat combining lock, the posting thread may discover that its request has already been enqueued. For example, the corresponding node may have been added to the local request queue by another combiner thread between the time that the request was posted (at 310) and the time that the posting thread acquires the flat combining lock (at 330) or finds that the flat combining lock is not taken (at 320). In this case (which, for simplicity, is not illustrated in FIG. 3), the posting thread may simply release the flat combining lock and proceed to 370.

If the flat-combining lock for the local cluster is already taken when the posting thread initially posts its request, another thread may be currently acting as a combiner thread for the local cluster. In this case (shown as the positive exit from 320), or in the case that the posting thread is unsuccessful in acquiring the local flat-combining lock (shown as the negative exit from 340), the method may include the posting thread waiting for a response to the lock acquisition request (e.g., waiting for an indication that its request has been queued to the local request queue), as in 325. For example, in some embodiments, the posting thread may spin on the "request ready" field of its publication list node, waiting for its value to return to "false". In some embodiments, the waiting thread may yield at this point to allow other threads on the same core to run. In some embodiments, while spinning, the waiting thread may checks to see if the flat combining lock is still taken and verify that its publication node is active. If the flat combining lock has been released, but the node has not yet been enqueued in the local request queue, a recent combiner thread may have failed to add the node to the local request queue. In this case, the posting thread may attempt to become the combiner (e.g., by returning to 320 and proceeding to 330). If the node is inactive, but has not yet been granted the hierarchical lock, the thread may mark it as active. If and when the value of the "request ready" field is reset to a value of "false" (e.g., by a combiner thread), this may indicate that the node has been added to the local request queue. In some embodiments, rather than resetting the "request ready" field of a waiting node to "false" itself, a combining thread may respond to the waiting thread by passing it a pointer to its successor field. When the waiting thread observes this response, it may reset its own "request ready" field.

Once the request has been added to the local request queue (and/or the global request queue), the posting thread may wait for an indication that it has been granted the hierarchical lock. For example, the posting thread may spin on the "is owner" field of its publication list node until the value of this field has been set to "true" (e.g., by its predecessor thread). This is illustrated in FIG. 3 by the feedback loop from the negative exit of 370 to the input of 370. Once the thread is granted the lock, it may access the critical section or shared resource protected by the lock, as in 380.

Note that in the hierarchical locks described herein, most nodes may be added to a publication list non-atomically, the exception being that an atomic operation (e.g., a CAS type operation) may be used to add a node at the head of the list. Therefore, the combiner may implement a simple wait-free traversal of the publication list. Note also that the removal of a node from the publication list may not require any synchronization as long as it is not performed on the node pointed to from the head of the list. For example, in some embodiments, only the thread holding the global lock may change the continuation of the list past this first node. Note, however, that the first node in the publication list is not an anchor or dummy node. Once a new node is inserted in the list, the node that was previously the first node in the list may be removed (e.g., if it is unused). However, even if no new nodes are added, leaving the first node in the list (even if it is unused) may not affect performance.

A common situation for any given thread is that its node is active in the publication list and some other thread is the combiner. In this case, to acquire the hierarchical lock, the thread may only have to indicate its request in the publication list for its cluster, check to see if the flat-combining lock is taken, and then wait for a response. Thus, the work of this thread in acquiring the lock may be completed after performing only a store (e.g., to its "request ready" field) and a sequence of loads (e.g., to determine if its node is active, and to determine whether the local flat-combining lock is taken) ending with a single cache miss. The end result may be that there is a lot of parallelism, and little synchronization overhead, in the process of collecting nodes into the local queue, which in turn may translate into reduced access time and longer sub-lists (e.g., when compared to the HCLH algorithm).

One embodiment of a method for combining publication list nodes into a local request queue and then splicing that local request queue into a global request queue is illustrated by the flow diagram in FIG. 4. Note that in some embodiments a combiner thread may traverse a publication list multiple times, collecting requests and adding them into the local queue, before splicing the local queue into the global queue. In such embodiments, each publication list (i.e. the publication list for each cluster) may be associated with a combining pass count. As illustrated at 410 in FIG. 4, a thread acting as a combiner thread may, at the start of a combining pass, increment such a combining pass count by one. Note that the combiner thread may be a thread that, after posting its own request to the publication list, has acquired the flat-combining lock for its cluster to become the combiner thread, as described above. The combiner thread may traverse the publication list (starting from the node identified as the publication list head), combining all non-empty acquisition requests into an ordered logical queue for the cluster (i.e. a local request queue), as in 420. As described above, the local request queue may share nodes with the publication list (i.e. it may be superimposed on the nodes in the publication list), in some embodiments. Note that, as described herein, the combiner thread may not add all of the nodes in the publication list to the local request queue. In some embodiments, the system may guarantee that this collection operation is done in a wait-free manner.

As illustrated at 430, in this example, the method may include the combiner thread setting the value of the "age" field in each of the nodes it adds to the local request queue to the current combining pass count, notifying each thread (i.e. each thread's node) who its successor in the local request queue is, and resetting the "request ready" field of each node added to the local request queue to a value of "false" to indicate that they have been queued. In other embodiments, each node may reset its own "request ready" field in response to being notified of its successor. Note that the successor for each thread/node is the node that the thread must notify upon releasing the hierarchical lock (e.g., upon leaving the global critical section or relinquishing access to a shared resource). After traversing the publication list, the combiner thread may add its own node to the local queue, and may set local head and tail pointers to point to the head and tail of the local queue, respectively. This is illustrated in FIG. 4 at 440. Note that, at this point, the local request queue tail pointer will identify the node of the combiner thread as the tail of the local request queue. In some embodiments, the combiner thread may set the "age" field and reset the "request ready" field of its own node when adding to the local request queue, but may leave an indication of the next node in the queue empty (or NULL), since it is the last node in the local request queue.

In some embodiments, the combiner thread may set a "can be global tail" flag in its own node, as in 450. As described below, this flag may be used by a lock releasing operation to determine whether the global tail needs to be read during the lock release operation. As illustrated at 460, the combiner thread may then release the flat-combining lock for its cluster. In some embodiments, the combiner thread may use an atomic operation to splice the node pointed to by the local head of the local queue into the node at the global queue's tail, as in 470, thus logically moving an entire collection of nodes (those in the local request queue) into the global request queue as a sub-queue of the global queue. As described above, after splicing the sub-queue into the global queue, the combiner thread may spin on the "is owner" flag in its node (not shown).

Note that in some embodiments, a thread, during its traversal of the publication list, may perform a cleanup operation on the publication list. For example, the thread may examine the age of each node in the publication list (beginning with the second node in the publication list), and may remove from the publication list all nodes whose age is much smaller than the current combining pass count. This may result in stale requests being removed from the publication list. In various embodiments, removing a node from the publication list may be done by unlinking the node from the list and/or by marking it as inactive. As previously noted, the node identified by the head pointer of the publication list may always be kept in the list, in some embodiments.

The splicing approach described above may in some embodiments be used to create an MCS-style global queue, spanning the sub-queues of multiple clusters, in which each thread knows only of its immediate successor, and yet all nodes are ordered in a global way that enhances the chances that nodes from a given cluster will follow one another in the queue. This may allow the algorithm to exploit data locality to achieve better performance. For example, by forming large collections of requests from the same cluster, the algorithm may minimize the lock handoff intervals.

In embodiments in which the global queue works in an MCS style as opposed to a CLH style (e.g., in an FC-MCS implementation, rather than an FC-CLH implementation), a thread spins on a field of its own node, notifies its successor upon leaving the critical section, and re-uses its own node in the next access attempt. By contrast, in HCLH and CLH algorithms (and, by extension, FC-CLH algorithms), threads spin on the nodes of their predecessors, update their own nodes, and use their predecessor's released nodes in their next lock acquisition attempts. The MCS style lock may serve several roles in the FC-MCS algorithm described herein, e.g., in the publication list, the lock access list, and the global queue. In order to remain in the publication list, a thread must use its own node repeatedly in all accesses, a property that holds for queuing in MCS style queue locks but not CLH style queue locks.

Note that in the original MCS lock algorithm, a thread releasing the lock may need to check the global tail pointer to determine if its node is the last in the MCS queue, and if so, the thread may perform a CAS type operation to change the value of the global tail pointer to NULL. This lookup of the global tail pointer may lead to a cache miss and a bus transaction if the global tail pointer was last modified by a thread of a remote cluster. In the FC-MCS algorithm, since the local queue combiner is at the local tail end of the sub-queue, no other node in that sub-queue can be the last node in the global request queue. Therefore, none of the intermediate nodes in the sub-queue need to make the above-mentioned check of the global tail pointer. In some embodiments, the algorithm uses a "can be global tail" field in each node to indicate to a thread whether its node can possibly be the last node in the global queue. In some embodiments, the combiner may set the "can be global tail" field in its own node to true, and then check the global tail pointer during its lock release operation. All other threads need not perform this check. If the node for the lock releasing thread has a successor, the lock releasing thread may hand over the lock ownership to the successor (e.g., by setting its "is owner" field to true).

This hierarchical lock release mechanism is further illustrated by the flow diagram in FIG. 5, according to one embodiment. In this example, a thread that holds a hierarchical lock begins an operation to release the lock, as in 510. If the releasing thread's node can be the tail node of the global queue (e.g., if the "can be global tail" field in the node is "true"), shown as the positive exit from 520, the thread may check the global tail indicator to determine whether the thread's node is, in fact, the tail node of the global queue (as in 530). If the releasing thread's node is the tail node of the global queue, shown as the positive exit from 530, the method may include the thread performing an atomic operation to set the global tail pointer to NULL (indicating that the node has no successors), as in 550. If the releasing thread cannot be the tail node of the global queue (shown as the negative exit from 520), or if it is determined not to be the tail node of the global queue (shown as the negative exit from 530), the releasing thread may hand off the hierarchical lock to the next node in the global queue, as in 540. For example, the releasing thread may set the "is owner" field of its successor to "true". In some embodiments, the releasing thread may also reset the "is owner" field in its own node to "false".

The algorithms for acquiring and releasing an FC-MCS hierarchical queue-based lock may be further illustrated by the pseudocode below, according to one embodiment. For the sake of clarity, some of the details presented herein are omitted from the pseudocode. For example, operations on the combining pass counter, the "age" field of each node, the publication list, and its head pointer do not appear in the pseudocode below, nor do variables representing an iteration limit or the number of combining operations to be evaluated when deciding whether to post directly to the global queue rather than using the FC-MCS scheme described herein.

```
myFCNode.isOwner = false;
myFCNode.canBeGlobalTail = false;
myFCNode.requestReady = true;
FCNode localTail = NULL;
FCNode localHead = NULL;
// lock acquire code
while (true) {
    if (myFCNode is not in FCQueue) {
        InsertFC(myFCNode);
    }
    if (FCQueue.FCLock not Acquired) {
        if (CAS(FCQueue.FCLock, Free, Acquired)) {
            if (myFCNode.requestReady) {
                // become the flat combiner
                for MaxCombiningIterations do {
                    for each FCNode in FCQueue do {
                        if (FCNode.requestReady == true&& FCNode !=
                        myFCNode) {
                            // add FCNode to the local wait queue
```

-continued

```
        if (localHead == NULL) {
            localHead = FCNode;
            localTail = FCNode;
        } else {
            localTail.next = FCNode;
            localTail = FCNode;
        }
        FCNode.requestReady = false;
    } else {
        if (retire FCNode from FCQueue?) {
            remove FCNode from FCQueue;
        }
    }
}
// add combiner's FCNode to the local wait queue
localTail.next = myFCNode;
localTail = myFCNode;
myFCNode.canBeGlobalTail = true;
myFCNode.requestReady = false;
// splice the local wait queue into the global wait queue
prevTail= SWAP(globalTail, localTail));
if (prevTail != NULL) {
    prevTail.next = localHead;
} else {
    localHead.isOwner = true;
}
// release the FCQueue.FCLock
FCQueue.FCLock = Free;
}
}
if (myFCNode.requestReady == false) {
    break;
}
}
// wait to become the lock owner
while (myFCNode.FCLock.isOwner == false);
// lock release code
if (myFCNode.canBeGlobalTail = = true) {
    while (true) {
        if (globalTail = = myFCNode) {
            if (CAS(globalTail, myFCNode, NULL) = = true) {
                // cleanup CAS succeeded
                break;
            }
        } else {
            // lock handoff
            myFCNode.next.isOwner = true;
            break;
        }
    }
} else {
    // lock handoff
    myFCNode.next.isOwner = true;
}
```

Figure 6A:
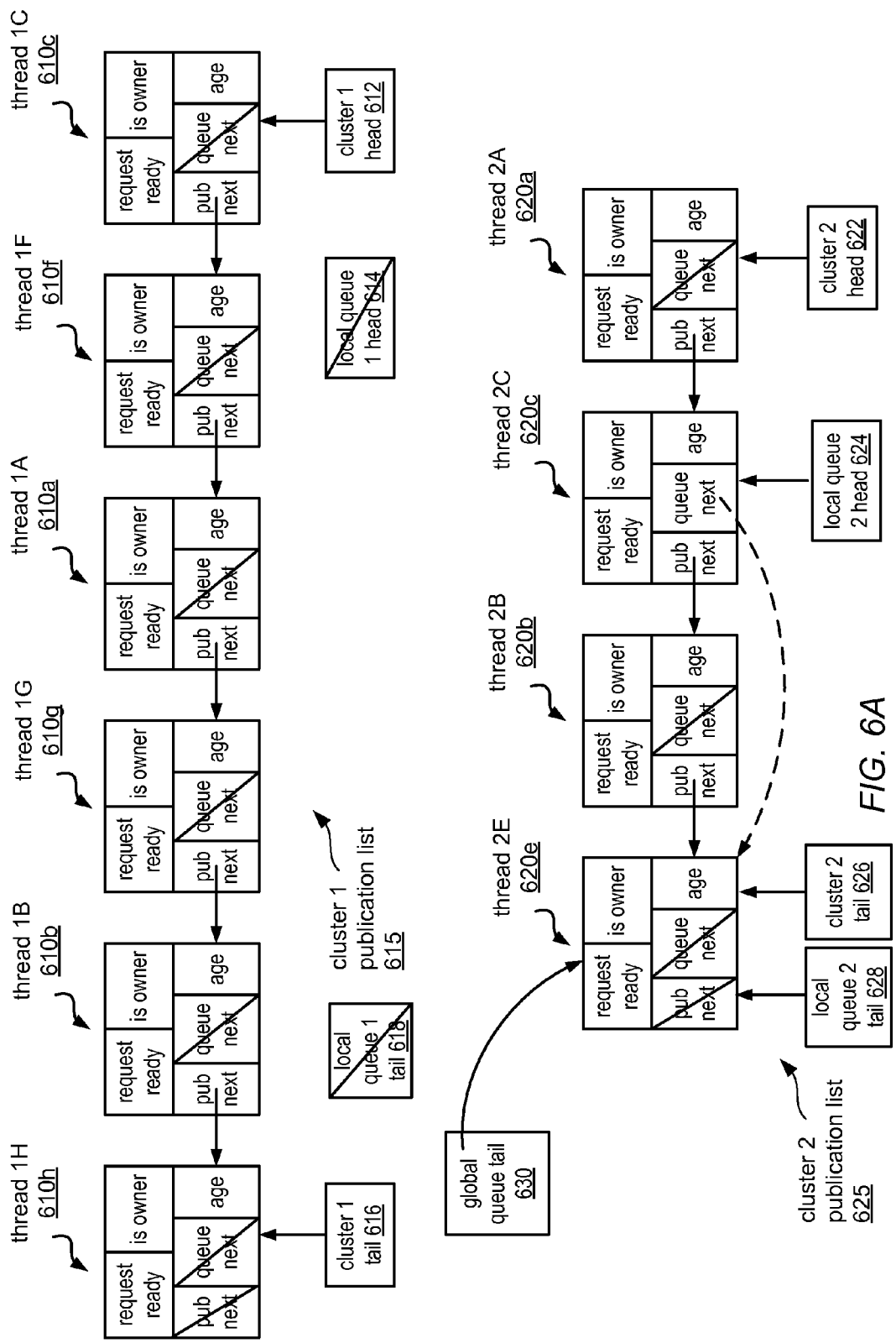
FIGS. 6A-6C are block diagrams illustrating the use of hierarchical queue-based locks that employ flat combining, according to one embodiment.
Figure 6B:
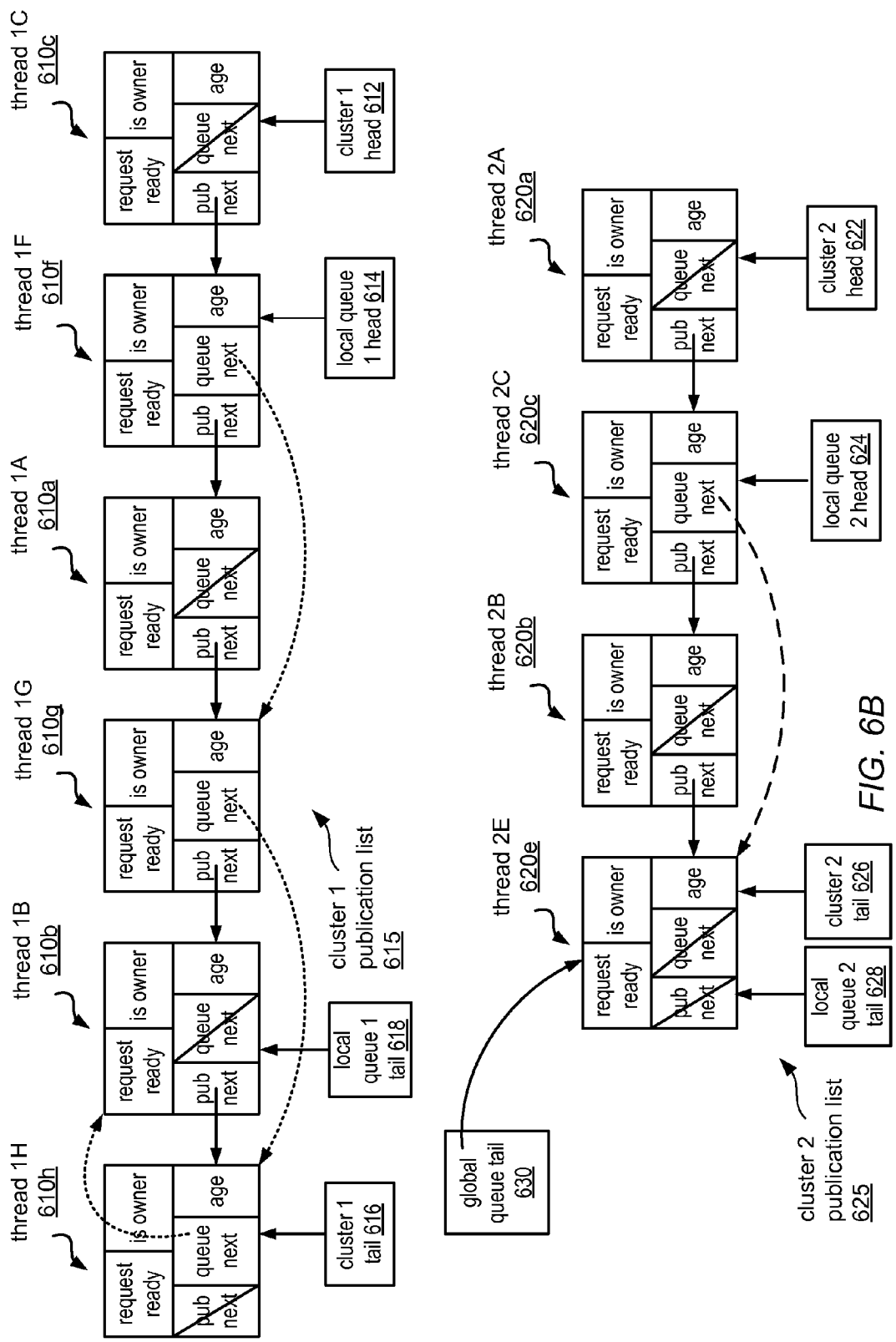
Figure 6C:
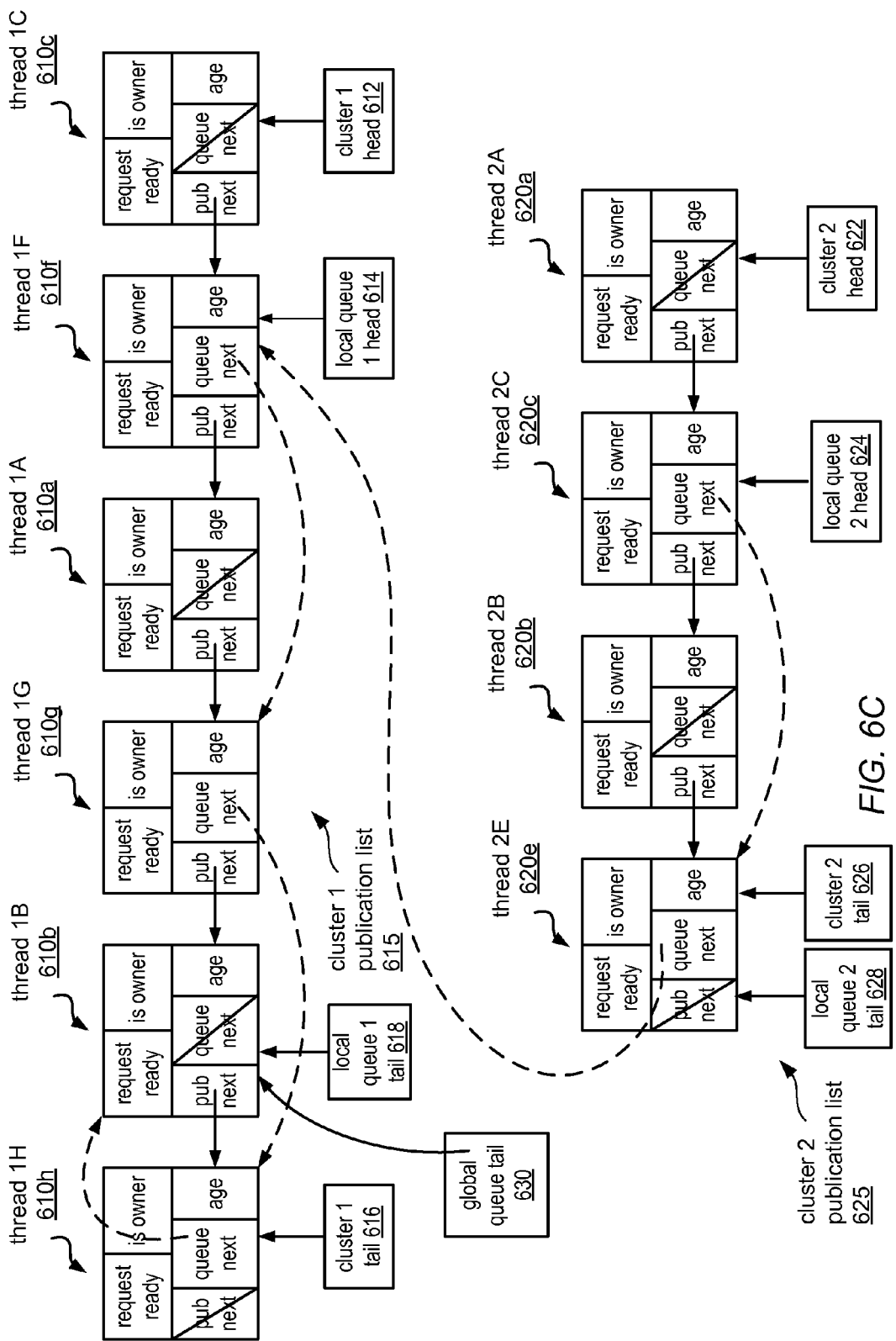

The hierarchical locks described herein may be further illustrated by the detailed example in FIGS. 6A-6C. These figures illustrate publication lists, local queues, and a shared global queue for two clusters in a computer system before and after a flat combining operation and an operation to splice a local request queue into a global queue are performed, according to one embodiment. In this example, FIGS. 6A-6C illustrate a publication list for a cluster 1 (shown as 615) and a publication list for a cluster 2 (shown as 625) on which local queues and a global queue may be superimposed. At the point in time represented in FIG. 6A, publication list 615 includes nodes associated with six threads: thread 1A (610a), thread 1B (610b), thread 1C (610c), thread 1F (610O, thread 1G (610g), and thread 1H (610h). Each node in the publication list includes a "request ready" field, an "is owner" field, an "age" field, a field indicating (e.g., using a pointer to) the next node in the publication list ("pub next") and a field usable to indicate the next node in a local request queue, if and when the node is included in a local request queue ("queue next"). The head of the publication list for cluster 1 (i.e. node 610c, which is associated with thread 1C) is indicated by cluster 1 head pointer 612. At the point in time illustrated in FIG. 6A, the order of the nodes in publication list 615 (shown by the arrows from each node's "pub next" field to its successor node) is: thread 1C, thread 1F, thread 1A, thread 1G, thread 1B, thread 1H. Note that in FIGS. 6A-6C, pointers and pointer fields that are not currently in use (e.g., pointer fields that are empty or contain a NULL value) are marked with a slash-through.

At the point in time illustrated in FIG. 6A, no local request queue exists for the nodes in publication list 615 (i.e. the threads of cluster 1). Therefore, the "queue next" fields in all of the nodes in publication list 615 are marked as unused, and the local queue 1 head pointer (614) and local queue 1 tail pointer (618) are also marked as unused. As indicated by cluster 1 tail pointer 616, node 610h (representing thread 1H) is the tail of the publication list. Therefore, its "pub next" field is also marked as unused. Note that for simplicity, some of the data structures and/or fields thereof associated with a cluster, its publication list, and any queues in which its nodes may be included are not included in FIGS. 6A-6C. For example, these figures do not illustrate a combining pass counter for each cluster, a flat-combining lock for each cluster, a tail node pointer for each local request queue, or a "can be global tail" field for each node. However, in some embodiments, any or all of these elements may be implemented for each cluster, and may have the functionality described herein. In various embodiments, more, fewer, or different elements than those illustrated in FIGS. 6A-6C may be included in the implementation of a hierarchical lock that employs the techniques described herein.

At the point in time represented in FIG. 6A, publication list 625 (for cluster 2) includes nodes associated with four threads: thread 2A (620a), thread 2B (620b), thread 2C (610c), and thread 2E (620e). Again, each node in the publication list includes a "request ready" field, an "is owner" field, an "age" field, a field indicating (e.g., using a pointer to) the next node in the publication list ("pub next") and a field usable to indicate the next node in a local request queue, if and when the node is included in a local request queue ("queue next"). The head of the publication list for cluster 2 (i.e. node 620a, which is associated with thread 2A) is indicated by cluster 2 head pointer 622. At the point in time illustrated in FIG. 6A, the order of the nodes in publication list 625 (shown by the arrows from each node's "pub next" field to its successor node) is: thread 2A, thread 2C, thread 2B, thread 2E.

At the point in time illustrated in FIG. 6A, a local request queue exists for cluster 2 that includes a subset of the nodes in publication list 625, and these nodes are also included in a global queue (as a sub-queue of the global queue). The head of the local request queue for cluster 2 (i.e. node 620c, which is associated with thread 2C) is indicated by local queue 2 head pointer 624. The tail of the local request queue for cluster 2 (i.e. node 620e, which is associated with thread 2E) is indicated by local queue 2 tail pointer 628. The local request queue for cluster 2 (which is also a sub-queue of the global request queue) is superimposed on the nodes of publication list 625. This local request queue (and sub-queue of the global request queue) includes nodes 620c (representing thread 2C) and 620e (representing thread 2E), and is illustrated in FIG. 6A by the dashed arrow from the "queue next" field of node 620c to node 620e. However, the local request queue for cluster 2, and hence the corresponding sub-queue of the global request queue, does not include nodes 620a (representing thread 2A) or 620b (representing thread 2B). Therefore, the "queue next" fields in nodes 620a and 620b are marked as unused. As indicated by cluster 2 tail pointer 626, node 620*e* (representing thread 2E) is the tail of the publication list. Therefore, its "pub next" field is marked as unused. In this example, node 620*e* (representing thread 2E) is also the tail node of the local request queue and (this local request queue having been spliced into the global queue) the global request queue, as indicated by global queue tail pointer 630. Therefore, its "queue next" field is also marked as unused. At the point in time illustrated in FIG. 6A, the global queue is indicated by the dashed line linking node 620*c* to node 620*e*. In this example, node 620*c* is the head of the global queue, and thread 2C holds the hierarchical lock. Upon releasing the hierarchical lock, thread 2C will update the "is owner" field of node 620*e* (its successor in the local request queue, and thus in the global request queue) to "true", effectively passing the hierarchical lock to thread 2E.

In the state illustrated in FIG. 6A, each active thread (i.e. each thread for which a request has been posted by setting the "request ready" field in its associated node) may wait for an indication that its request has been queued, and/or may spin on its "is owner" field until it is granted the lock. Beginning from this state, new nodes may be added to the heads of either of the publication lists, a combiner thread may collect nodes from one of the publication lists to build a local request queue and splice the local request queue into the global queue, and/or aged nodes may be removed by a combiner thread.

FIG. 6B illustrates the effects of a combiner pass on cluster 1, according to one embodiment. At the point in time illustrated in FIG. 6B, thread 1B has become a combiner thread for cluster 1 (e.g., by acquiring the flat combiner lock for cluster 1) and has built a local request queue for cluster 1, but has not yet spliced the local request queue for cluster 1 into the global queue. As described above, upon becoming the combiner thread, thread 1B may have updated the combining pass count for cluster 1 and begun building a local request queue for cluster 1. In this example, combiner thread 1B traversed publication list 612 to combine lock requests found in the nodes of publication list 615 into a queue that can be spliced into the global request queue as a sub-queue. Combiner thread 1B collected a list of requests consisting of nodes 610*f* (representing thread 1F), 610*g* (representing thread 1G), and 610*h* (representing thread 1H).

In this example, the local request queue for cluster 1 is superimposed on the nodes of publication list 615 and is indicated by the dotted path that links the "queue next" field of node 610*f*, to node 610*g*, and the "queue next" field of node 610*g* to node 610*h*. As described above, combiner thread 1B may set the value of the "age" field of each of these nodes to the current combining pass count, notify each thread who its successor in the queue is (e.g., my setting its "queue next" pointer to point to its successor node), and resetting the "request ready" field of each node to "false". Combiner thread 1B then adds its own node (610*b*) as the last node (i.e. the tail node) in the local request queue, shown by the dotted path linking the "queue next" field of node 610*h* to node 610*b*. As previously noted, combiner thread 1B may set the value of its own "age" field to the current combining pass count, reset its "request ready" field, and/or set its "can be global tail" to "true". In this example, since nodes 610*a* and 610*c* are not included in the local request queue collected by thread 1B, the "queue next" field in each of these nodes remains unused following this combining pass. In addition, since node 610*b* is the tail node of the local request queue, its "queue next" field also remains marked as unused in FIG. 6B. In the resulting local request queue for cluster 1, the head of the local request queue (i.e. node 610*f*, which is associated with thread 1F) is indicated by local queue 1 head pointer 614. The tail of the local request queue for cluster 1 (i.e. node 610*b*, which is associated with thread 1B) is indicated by local queue 1 tail pointer 618.

FIG. 6C illustrates the effect of a splicing operation on the global queue of the computer system of FIGS. 6A-6C, according to one embodiment. At the point in time illustrated in FIG. 6C, the combiner thread 1B has spliced the local request queue for cluster 1 into the shared global request queue for clusters 1 and 2, again superimposing the global request queue on the nodes of publication lists 615 and 625. To splice the local request queue for cluster 1 into the global request queue as a sub-queue, combiner thread 1B has set the "queue next" field of node 620*e* (which was previously the tail node of the global request queue) to point to the head of the local request queue for cluster 1 (i.e. node 610*f*), and has set global tail pointer 630 to point to the tail of the local request queue for cluster 1 (i.e. node 610*b*). This effectively spliced all of the nodes of local request queue for cluster 1 (in the same order in which they are linked in the local request queue) into the global queue as a sub-queue. The dashed line in FIG. 6C indicates the linking of all of the nodes of global request queue following this splicing operation.

The techniques described above may work exceptionally well at high concurrency levels. However, at low concurrency levels, combining requests into sufficiently large sub-queues may become difficult and/or time-consuming (if not impossible), leaving the unwanted overhead of multiple attempts to combine nodes into a reasonably sized sub-queue. Therefore, in some embodiments, when the system is operating with low concurrency levels, some threads may be permitted to skip the attempt to combine nodes into a local sub-queue, and to access the global queue directly. Note that in the FC-MCS algorithmic design described herein, batches of nodes may be added to the global queue by combiners seamlessly, while still maintaining the properties of an MCS style queue with respect to all other nodes in the global queue. This may allow individual threads to access the global queue and to add themselves to the global queue in a straightforward manner. In embodiments that support this combined algorithm, threads may apply a simple local test to determine whether they should combine multiple threads into a sub-queue before adding them to the global queue or attempt to access the global queue directly. In one embodiment, threads may count the size of the sub-queue each time they are the combiners, and if the size of the sub-queue is low several times, they may switch to direct access with high probability. Subsequently, if during a given access, it is observed that the combined queue is very large, the thread may switch back to combining nodes into sub-queues prior to splicing them into the global queue.

Note that the effectiveness of the flat combining operation may be sensitive to the arrival rate of the threads. For example, if the thread arrival rate is low, the flat combiner must iterate more times through the flat-combining queue in order to batch together a reasonably large number of locking requests. However, allowing the combiner to repeatedly iterate through the flat-combining queue too many times may result in an overall increase in the latency of the locking operation. In some embodiments, the algorithm may be configured to dynamically adapt the combiner's iteration limit (the number of times that the combiner iterates through the flat combining operation to build a sub-queue prior to splicing it into the global queue) to the underlying workload. Some embodiments implement a heuristic in which, following a flat combining operation, if the combiner determines that the ratio of the size of the flat-combining queue (i.e. the local request queue or global request sub-queue) and the number of requests batched together by the combiner is below a particular threshold (e.g., 50%), the combiner increments the iteration limit. In some embodiments, this increment may be subject to a maximum ceiling (e.g., 16). On the other hand, if this ratio goes beyond a particular threshold (e.g., 90%), the iteration limit may be decremented by the combiner (if the iteration limit is currently greater than 1). This heuristic appears to work very well for adapting the iteration limit to a variety of workloads. In other embodiments, other heuristics may be applied for determining when and if to adjust an iteration limit. For example, another heuristic may be based on a mathematical expression that includes both the sub-queue length and the number of combiner passes.

Figure 7:
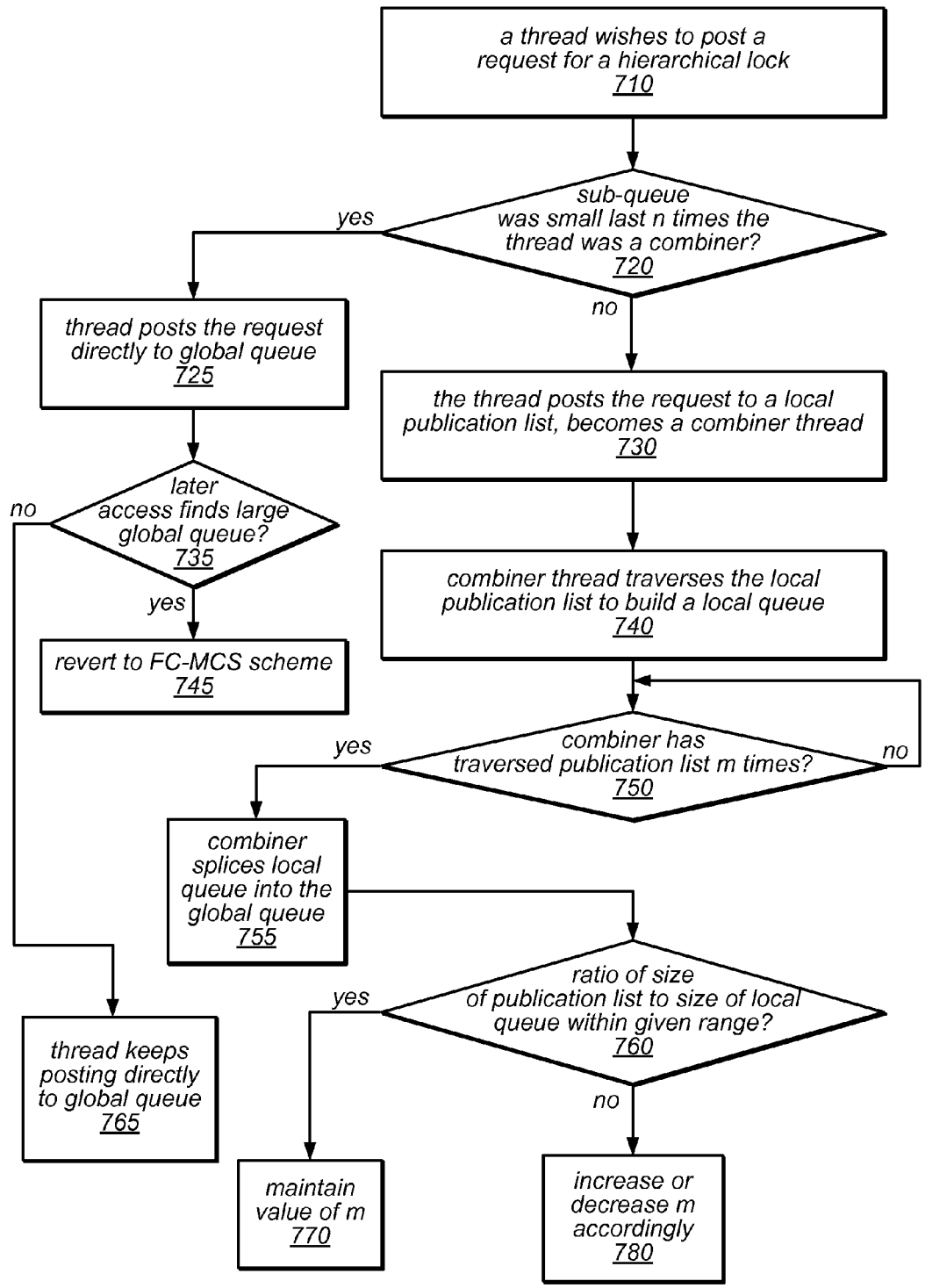
FIG. 7 is a flow diagram illustrating a method for applying various adaptive algorithms to the hierarchical locks described herein, according to one embodiment.

The use of the two adaptive algorithms described above may be further illustrated by the flow diagram in FIG. 7, according to one embodiment. In this example, a thread wishes to post a request for a hierarchical lock, as in 710. If the sub-queue spliced into the global request queue by this thread the last n times that the thread acted as the combiner thread for its cluster was small (where n represents a pre-determined number of combining operations to be evaluated), shown as the positive exit from 720, the method may include the thread posting its lock request directly into the global queue, as in 725, rather than posting it to the local publication list and waiting for it to be combined into a local request queue and then spliced into the global request queue. For example, if the sub-queue length was smaller than a pre-determined threshold number for n combining operations in a row, or the average length of the sub-queue was smaller than a pre-determined threshold number for the n most recent combining operations performed by that thread, the thread may post the lock request into the global request queue using a CAS type operation to insert a corresponding node into the tail of the global request queue.

In some embodiments, once a given thread posts directly to the global request queue, as in 725, that thread may continue to post its lock acquisition requests directly to the global request queue until or unless conditions change. For example, if during an subsequent access to the global request queue the thread finds that the global request queue is very large, shown as the positive exit from 735, the thread may revert to the FC-MCS algorithm described herein (e.g., posting requests to a publication list, from which they will be combined into sub-queues before being spliced into the global request queue), as in 745. While the global request queue size remains within a pre-determined range, shown as the negative exit from 735, the thread may continue to post its requests directly to the global queue, as in 765.

In this example, if the sub-queue spliced into the global request queue by this thread the last n times that the thread acted as the combiner thread for its cluster was not small, shown as the negative exit from 720, the method may include the thread posting its request to a local publication list, as in 730, and the thread becoming (or at least attempting to become) a combiner thread for its cluster. As illustrated at 740 in FIG. 7, the method may include the combiner thread (which may be the posting thread or another thread in the cluster) traversing the local publication list and building a local queue, as described herein. If the combiner thread has not yet traversed the publication list m times, shown as the negative exit from 750, the method may include the combiner thread traversing the publication list one or more addition times until the combining pass count value is m. This is illustrated in FIG. 7 by the feedback loop from 750 to 740.

Once the combiner thread has traversed the publication list m times, collecting nodes and combining them into the local queue, shown as the positive exit from 750, the method may include the combiner thread splicing the local queue into the global queue as a sub-queue of the global queue, as in 755. As described above, m may be a pre-determined (but dynamically configurable) number of combining passes that a combiner thread performs when building a local request queue (e.g., a configurable iteration limit). In some embodiments, after splicing a local request queue into the global request queue, a combiner thread may determine whether a different value of m would be appropriate for its cluster and the cluster's current workload. In the example illustrated in FIG. 7, if the ratio of the size (i.e. length) of the publication list to the size of the local queue built by the combiner thread is within a given range, shown as the positive exit from 760, there may be no change to the value of m. However, if the ratio of the size of the publication list to the size of the local queue built by the combiner thread is outside that given range, shown as the negative exit from 760, the thread may increase or decrease the value of m accordingly, as in 780. In some embodiments, this new value of m may be used by the thread (or by all of the threads of the cluster) in subsequent combining operations until or unless it is changed by a thread as a result of a similar evaluation of its efficiency.

Note that the flat-combining structure of the FC-MCS locking algorithm described herein may not be especially memory efficient in certain situations. For example, if multiple locks are being accessed, a thread may have to maintain one node per lock for any lock that it is repeatedly accessing, and these nodes may not be recycled until after a thread has ceased to access a given lock. Therefore, in some embodiments, FC-MCS locks may not be well suited for applications in which memory resources are limited.

Experiments comparing the FC-MCS algorithm described herein with other known locking algorithms (e.g., CLH and MCS queue locks, the HBO hierarchical back-off lock, and the HCLH hierarchical queue lock) have shown that the FC-MCS algorithm outperforms all these prior algorithms. In these experiments, all algorithms were implemented in C++, and compiled with an optimizing C++ compiler. The experiments were conducted on a machine that includes four processor chips, each of which contains eight processor cores, where each processor core contains eight hardware thread contexts. Each processor chip includes an on board 4 MB L2 cache, and each processor core includes an 8 KB L1 data cache which is shared between its hardware threads. To emphasize the impact of locality on these algorithms, the number of threads in all workloads was evenly distributed between the four processor chips. For example, for a test involving 32 threads, 8 threads were bound to each processor chip. This thread binding helped ensure that the thread distribution was maintained throughout the runs. In all of the tests, the main thread launched a group of threads, each of which executed a critical region 100,000 times. Each iteration included a critical and a non-critical region, both of which could be configured differently to capture the behaviors of a diverse set of workloads.

One experiment was configured to evaluate the scalability results of a workload in which each thread executes a single read and a single write (essentially a counter increment) in its critical region. Such critical regions routinely occur in realistic workloads. In this experiment, the non-critical region consisted of an idle spin loop for a randomly selected interval between 0 and 4 microseconds. This reflects a fair amount of work done between consecutive critical region executions. The average latency of executing one pass through the critical and non-critical execution regions was measured as the number of threads was varied. In this experiment, the FC-MCS algorithm described herein was shown to scale significantly better than all of the other algorithms beyond 32 threads. For example, the average latency of the FC-MCS algorithm at this scale showed an improvement over MCS and CLH locks by a factor of four, and over HCLH by a factor of two. Some of this improvement may be attributed to the multicore architecture in which threads share an L2 cache and therefore have a big win from locality of reference. At low thread counts all of the algorithms performed poorly, largely due to a lack of pipelining in performing various synchronization operations. The non-critical section is large, and so performance could only improve as concurrency increased. As concurrency increased, threads overlapped executing the critical section with the lock acquisition operations and the average latency improved. Note that when the number of thread was less than 32, the FC-MCS algorithm performed similarly to the original MCS algorithm. In this case, the low level of combining often caused threads to skip the combining attempts and post their requests directly access the global MCS lock.

Other experiments were configured to help explain the better performance of FC-MCS at high thread counts. One measured the average number of atomic CAS and/or SWAP type instruction performed as the number of threads was varied. This experiment demonstrated that the average number of atomic instructions per critical region was drastically lower in the FC-MCS algorithm when compared to all other algorithms. Atomic operations in all the compared algorithms are executed on shared locations and are thus indicative of bottlenecks. In the MCS, CLH, and HBO algorithms, all operations are applied sequentially on the same global location. The HBO algorithm suffered from increased CAS failures but experienced better cache locality than some of the other algorithms. In this experiment, the lock itself was bouncing around from chip to chip, and as the concurrency level increased, the algorithms benefited more and more from locality (for those that improved locality). Another experiment measured the average number of lock acquisition requests collected (or batched) by the combiner threads of the FC-MCS algorithm and by the master in the HCLH algorithm as the number of threads was varied. In the HCLH algorithm, although there is parallelism among local queues, the building of the local CLH queue requires atomic operations on the local queue's tail pointer, which introduces a sequential bottleneck. This experiment demonstrated that this bottleneck resulted in smaller "batches" of local CLH queue nodes in the global CLH queue (for any number of threads) when compared to the FC-MCS algorithm. For example, the FC-MCS algorithm does not include such a bottleneck when posting requests, but allows threads to apply simple write operations in parallel, which the combiner then picks up. The result is a high level of batching (especially at higher concurrency levels). In one experiment, close to 90% of requests were batched, which largely explains the factor-of-two better performance of the FC-MCS algorithm over the HCLH algorithm. At lower concurrency levels, obtaining large batches is difficult (if not impossible), and the overhead of the flat combining operations along the critical path may be the dominant factor in its performance.

In order to stress test all the locking algorithms, experiments were conducted in which the critical and non-critical sections were empty. In these experiments all threads essentially acquired and released the lock 100,000 times, and number of threads was varied. Although these experiments may not represent a realistic workload, it avoids the issue of non-critical work masking any lock operation latencies, thus enabling a "bare bones" comparison between the different algorithms. In one experiment, the average latency of the critical and non-critical execution regions was measured as the number of threads varied. In this experiment, the HBO algorithm performed best when the number of threads was extremely low, but deteriorated as concurrency increased (there being no gain from locality in the critical section). As concurrency increased, the CLH algorithm scaled worst, followed by the HCLH algorithm, the original MCS algorithm, and the FC-MCS algorithm, in that order. Note that in these experiments, the improvement of the FC-MCS algorithm over the original MCS algorithm was not as great as in the previously described experiments. For example, at low concurrency levels the FC-MCS algorithm may skip the flat combining operation, and may run what is essentially the original MCS algorithm directly on the global queue. At high concurrency levels, in these experiments, there may be no gain from locality to offset the additional work done by the FC-MCS algorithm to collect large batches of lock acquisition requests. Nevertheless, the FC-MCS algorithm has been demonstrated to scale much better than all other algorithms. In some embodiments, this may be largely attributed to the smaller number of atomic operations that are performed when posting lock acquisition requests and to its faster mechanism for building sub-queues to be spliced into the global queue.

Figure 8:
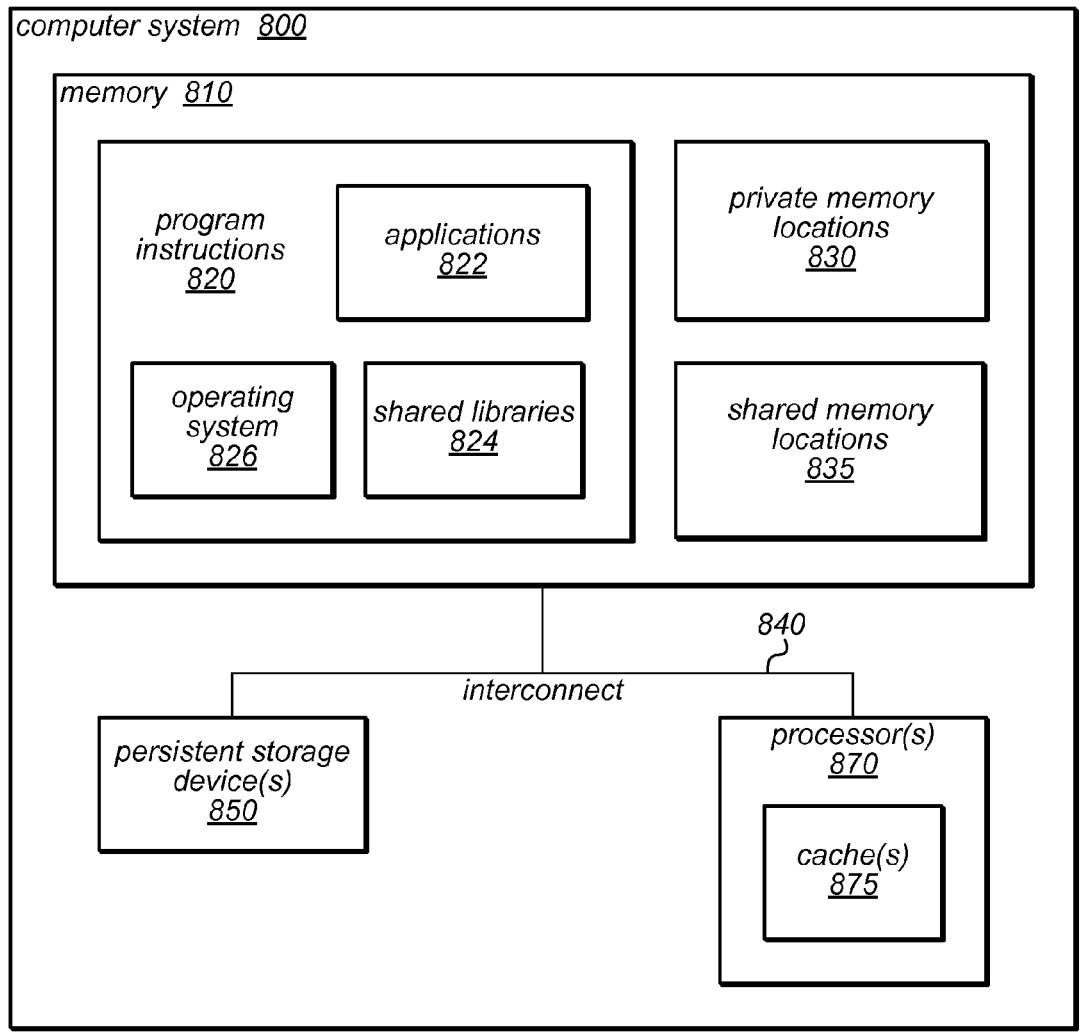
FIG. 8 illustrates a computing system configured to implement hierarchical queue-based locks using flat combining, according to various embodiments.

FIG. 8 illustrates a computing system configured to implement the methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing hierarchical queue-based locks using flat combining, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 800 may include one or more processors 870; each may include multiple cores, any of which may be single or multi-threaded. For example, as illustrated in FIG. 2, multiple processor cores may included in a single processor chip (e.g., a single processor 870), and multiple processor chips may be included on a CPU board, two or more of which may be included in computer system 800. Each of the processors 870 may include a hierarchy of caches, in various embodiments. For example, as illustrated in FIG. 2, each processor chip 870 may include multiple L1 caches (e.g., one per processor core) and a single L2 cache (which may be shared by the processor cores on the processor chip). The computer system 800 may also include one or more persistent storage devices 850 (e.g. optical storage, magnetic storage, hard drive, tape drive, solid state memory, etc) and one or more system memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, the storage device(s) 850, and the system memory 810 may be coupled to the system interconnect 840. One or more of the system memories 810 may contain program instructions 820. Program instructions 820 may be executable to implement one or more applications 822 (which may include one or more accesses to a critical section or shared resource protected by a hierarchical lock, as described herein), shared libraries 824, or operating systems 826. In some embodiment, program instructions 820 may be executable to implement a contention manager (not shown). Program instructions 820 may be encoded in platform native binary, any interpreted language such as Java™ byte-code, or in any other language such as C/C++, Java™, etc or in any combination thereof. The program instructions 820 may include functions, operations and/or other processes for implementing hierarchical queue-based locks using flat combining, as described herein. Such support and functions may exist in one or more of the shared libraries 824, operating systems 826, or applications 822, in various embodiments. The system memory 810 may further comprise private memory locations 830 and/or shared memory locations 835 where data may be stored. For example, shared memory locations 835 may store data accessible to concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of MCS style locks, it should be noted that the techniques and mechanisms disclosed herein for implementing hierarchical queue-based locks using flat combining may be applicable in other contexts in which critical sections and/or shared resources may be protected by other types of locks (e.g., CLH style locks). It is intended that the following claims be interpreted to embrace all such variations and modifications.

What is claimed:

1. A method, comprising:
performing by a computer:
beginning execution of a multithreaded application that comprises one or more requests to acquire a shared lock;
a thread of the application executing on one of a plurality of processor cores in a cluster of processor cores that share a memory posting a request to acquire the shared lock in a publication list for the cluster using a non-atomic operation write operation, wherein the publication list comprises a plurality of nodes, each of which is associated with a respective thread that accesses the shared lock, and wherein the cluster of processor cores is one of a plurality of clusters of processor cores;
the thread building a local lock acquisition request queue comprising the node associated with the thread and one or more other nodes of the publication list for the cluster, wherein each of the one or more other nodes is associated with a respective thread that has posted a request to acquire the shared lock, and wherein the local lock acquisition request queue is an ordered queue in which each node of the queue comprises a pointer to its successor node in the queue;
the thread splicing the local lock acquisition queue into a global lock acquisition request queue for the shared lock as a sub-queue of the global lock acquisition request queue, wherein the global lock acquisition request queue comprises one or more other sub-queues, each of which comprises one or more nodes associated with threads executing on a processor core in a particular cluster of processor cores;
the thread waiting for an indication that it has been granted the shared lock; and
in response to the thread receiving an indication that it has been granted the shared lock, the thread accessing a critical section or shared resource that is protected by the shared lock.

2. The method of claim 1, where said waiting comprises the thread repeatedly reading the value of an indicator of lock ownership in the node associated with the thread until the value of the indicator indicates that the thread has been granted ownership of the shared lock.

3. The method of claim 1, wherein the local lock acquisition request queue is a logical queue in which the nodes of the queue are shared with the nodes of the publication list for the cluster.

4. The method of claim 1, wherein the global lock acquisition request queue is a logical queue in which the nodes of the queue are shared with the nodes of one or more publication lists for one or more clusters of processor cores.

5. The method of claim 1,
wherein said posting a request comprises the thread writing a particular value to an indicator of a pending request in the node associated with the thread; and
wherein said building comprises the thread traversing the publication list to identify the one or more other nodes that are associated with threads that have posted requests to acquire the shared lock.

6. The method of claim 5, wherein said traversing is performed two or more times prior to said splicing, and wherein the number of times said traversing is performed is dependent on a heuristic that considers the effectiveness of one or more previous local lock acquisition request queue building operations performed by the thread.

7. The method of claim 1, wherein said splicing comprises atomically replacing the value of a pointer that identifies the tail node of the global lock acquisition request queue with the value of a pointer that identifies the tail node of the local lock acquisition request queue.

8. The method of claim 1, wherein said splicing comprises replacing the value of a pointer in the tail node of the global lock acquisition request queue that identifies the next node in the global lock acquisition request queue with the value of a pointer that identifies the head node of the local lock acquisition request queue.

9. The method of claim 1, further comprising:
a second thread of the application determining whether one or more local lock acquisition request queues previously built by the second thread were of a length shorter than a pre-determined minimum target length; and
in response to determining that the one or more local lock acquisition request queues previously built by the second thread were of a length shorter than the pre-determined minimum target length, the second thread posting a request to acquire the shared lock directly to the global lock acquisition request queue;

wherein posting the request directly to the global lock acquisition request queue comprises the second thread using an atomic operation to insert a node associated with the second thread as a new tail node of the global lock acquisition request queue.

10. A system comprising:
a plurality of processor core clusters, each of which comprises two or more processor cores that support multithreading and that share a local memory;
a system memory coupled to the one or more processors;
wherein the system memory stores program instructions that when executed on one or more processor cores in the plurality of processor core clusters causes the one or more processor cores to perform:
  a thread executing on one of the plurality of processor cores in a given cluster of processor cores posting a request to acquire a shared lock in a publication list for the given cluster using a non-atomic operation write operation, wherein the publication list comprises a plurality of nodes, each of which is associated with a respective thread that accesses the shared lock;
  the thread building a local lock acquisition request queue comprising the node associated with the thread and one or more other nodes of the publication list for the given cluster, wherein each of the one or more other nodes is associated with a respective thread that has posted a request to acquire the shared lock, and wherein the local lock acquisition request queue is an ordered queue in which each node of the queue comprises a pointer to its successor node in the queue;
  the thread splicing the local lock acquisition queue into a global lock acquisition request queue for the shared lock as a sub-queue of the global lock acquisition request queue, wherein the global lock acquisition request queue comprises one or more other sub-queues, each of which comprises one or more nodes associated with threads executing on a processor core in a particular cluster of processor cores;
  the thread waiting for an indication that it has been granted the shared lock; and
  in response to the thread receiving an indication that it has been granted the shared lock, the thread accessing a critical section or shared resource that is protected by the shared lock.

11. The system of claim 10, where said waiting comprises the thread repeatedly reading the value of an indicator of lock ownership in the node associated with the thread until the value of the indicator indicates that the thread has been granted ownership of the shared lock.

12. The system of claim 10, wherein at least one of the local lock acquisition request queue and the global lock acquisition request queue is a logical queue in which the nodes of the queue are shared with the nodes of the publication list for the given cluster.

13. The system of claim 10,
wherein said posting a request comprises the thread writing a particular value to an indicator of a pending request in the node associated with the thread;
wherein said building comprises the thread traversing the publication list one or more times to identify the one or more other nodes that are associated with threads that have posted requests to acquire the shared lock; and
wherein the number of times said traversing is performed is dependent on a heuristic that considers the effectiveness of one or more previous local lock acquisition request queue building operations performed by the thread.

14. The system of claim 10, wherein said splicing comprises:
atomically replacing the value of a pointer that identifies the tail node of the global lock acquisition request queue with the value of a pointer that identifies the tail node of the local lock acquisition request queue; and
replacing the value of a pointer in the tail node of the global lock acquisition request queue that identifies the next node in the global lock acquisition request queue with the value of a pointer that identifies the head node of the local lock acquisition request queue.

15. The system of claim 10, wherein when executed on the one or more processor cores in the plurality of processor core clusters the program instructions further cause the one or more processor cores to perform:
  a second thread of the application determining whether one or more local lock acquisition request queues previously built by the second thread were of a length shorter than a pre-determined minimum target length; and
  in response to determining that the one or more local lock acquisition request queues previously built by the second thread were of a length shorter than the pre-determined minimum target length, the second thread posting a request to acquire the shared lock directly to the global lock acquisition request queue;
  wherein posting the request directly to the global lock acquisition request queue comprises the second thread using an atomic operation to insert a node associated with the second thread as a new tail node of the global lock acquisition request queue.

16. A non-transitory, computer readable storage medium storing program instructions that when executed on one or more computers cause the one or more computers to perform:
  beginning execution of a multithreaded application that comprises one or more requests to acquire a shared lock;
  a thread of the application executing on one of a plurality of processor cores in a cluster of processor cores that share a memory posting a request to acquire the shared lock in a publication list for the cluster using a non-atomic operation write operation, wherein the publication list comprises a plurality of nodes, each of which is associated with a respective thread that accesses the shared lock, and wherein the cluster of processor cores is one of a plurality of clusters of processor cores;
  the thread building a local lock acquisition request queue comprising the node associated with the thread and one or more other nodes of the publication list for the cluster, wherein each of the one or more other nodes is associated with a respective thread that has posted a request to acquire the shared lock, and wherein the local lock acquisition request queue is an ordered queue in which each node of the queue comprises a pointer to its successor node in the queue;
  the thread splicing the local lock acquisition queue into a global lock acquisition request queue for the shared lock as a sub-queue of the global lock acquisition request queue, wherein the global lock acquisition request queue comprises one or more other sub-queues, each of which comprises one or more nodes associated with threads executing on a processor core in a particular cluster of processor cores;
  the thread waiting for an indication that it has been granted the shared lock; and
  in response to the thread receiving an indication that it has been granted the shared lock, the thread accessing a critical section or shared resource that is protected by the shared lock.

17. The storage medium of claim 16, where said waiting comprises the thread repeatedly reading the value of an indicator of lock ownership in the node associated with the thread until the value of the indicator indicates that the thread has been granted ownership of the shared lock.

18. The storage medium of claim 16, wherein at least one of the local lock acquisition request queue and the global lock acquisition request queue is a logical queue in which the nodes of the queue are shared with the nodes of the publication list for the given cluster.

19. The storage medium of claim 16,
wherein said posting a request comprises the thread writing a particular value to an indicator of a pending request in the node associated with the thread;
wherein said building comprises the thread traversing the publication list one or more times to identify the one or more other nodes that are associated with threads that have posted requests to acquire the shared lock; and
wherein the number of times said traversing is performed is dependent on a heuristic that considers the effectiveness of one or more previous local lock acquisition request queue building operations performed by the thread.

20. The storage medium of claim 16, wherein said splicing comprises:
atomically replacing the value of a pointer that identifies the tail node of the global lock acquisition request queue with the value of a pointer that identifies the tail node of the local lock acquisition request queue; and
replacing the value of a pointer in the tail node of the global lock acquisition request queue that identifies the next node in the global lock acquisition request queue with the value of a pointer that identifies the head node of the local lock acquisition request queue.

* * * * *